(12) United States Patent
Rutterman et al.

(10) Patent No.: US 6,249,628 B1
(45) Date of Patent: Jun. 19, 2001

(54) FIBER OPTIC CABLE UNITS

(75) Inventors: Daniel J. Rutterman; William C. Hurley, both of Hickory, NC (US)

(73) Assignee: Siecor Operations, LLC, Hickory, NC (US)

( * ) Notice: Subject to any disclaimer, the term of this patent is extended or adjusted under 35 U.S.C. 154(b) by 0 days.

(21) Appl. No.: 09/329,567

(22) Filed: Jun. 10, 1999

(51) Int. Cl.⁷ .................................................. G02B 6/44
(52) U.S. Cl. ........................ 385/106; 385/100; 385/101; 385/109; 385/110; 385/112; 385/113
(58) Field of Search .................................. 385/100, 101, 385/105, 106, 109, 110, 112, 113, 107

(56) References Cited

U.S. PATENT DOCUMENTS

| | | | |
|---|---|---|---|
| 4,707,074 | * | 11/1987 | Heywood .................. 385/100 X |
| 4,815,814 | * | 3/1989 | Ulijasz ....................... 385/100 X |
| 5,740,295 | * | 4/1998 | Kinard et al. ................. 385/109 |
| 5,761,362 | * | 6/1998 | Yang et al. ................... 385/109 |
| 5,970,196 | * | 10/1999 | Greveling et al. ............ 385/114 |

\* cited by examiner

*Primary Examiner*—Brian Healy
(74) *Attorney, Agent, or Firm*—Timothy J. Aberle

(57) ABSTRACT

Fiber optic and composite zip cord cables (40;50) having at least one respective buffer unit (30) therein. Each zip cord (40;50) includes at least two cords (42;52,54) having respective jackets (46;56) attached by a frangible web (43;53). At least one cord includes a buffer unit (30) generally surrounded by a layer of filaments, the buffer unit comprising at least two optical fibers (31) in a buffer layer (32). The buffer units (30) can be stranded about a central member (22) and enclosed in a jacket (28).

20 Claims, 2 Drawing Sheets

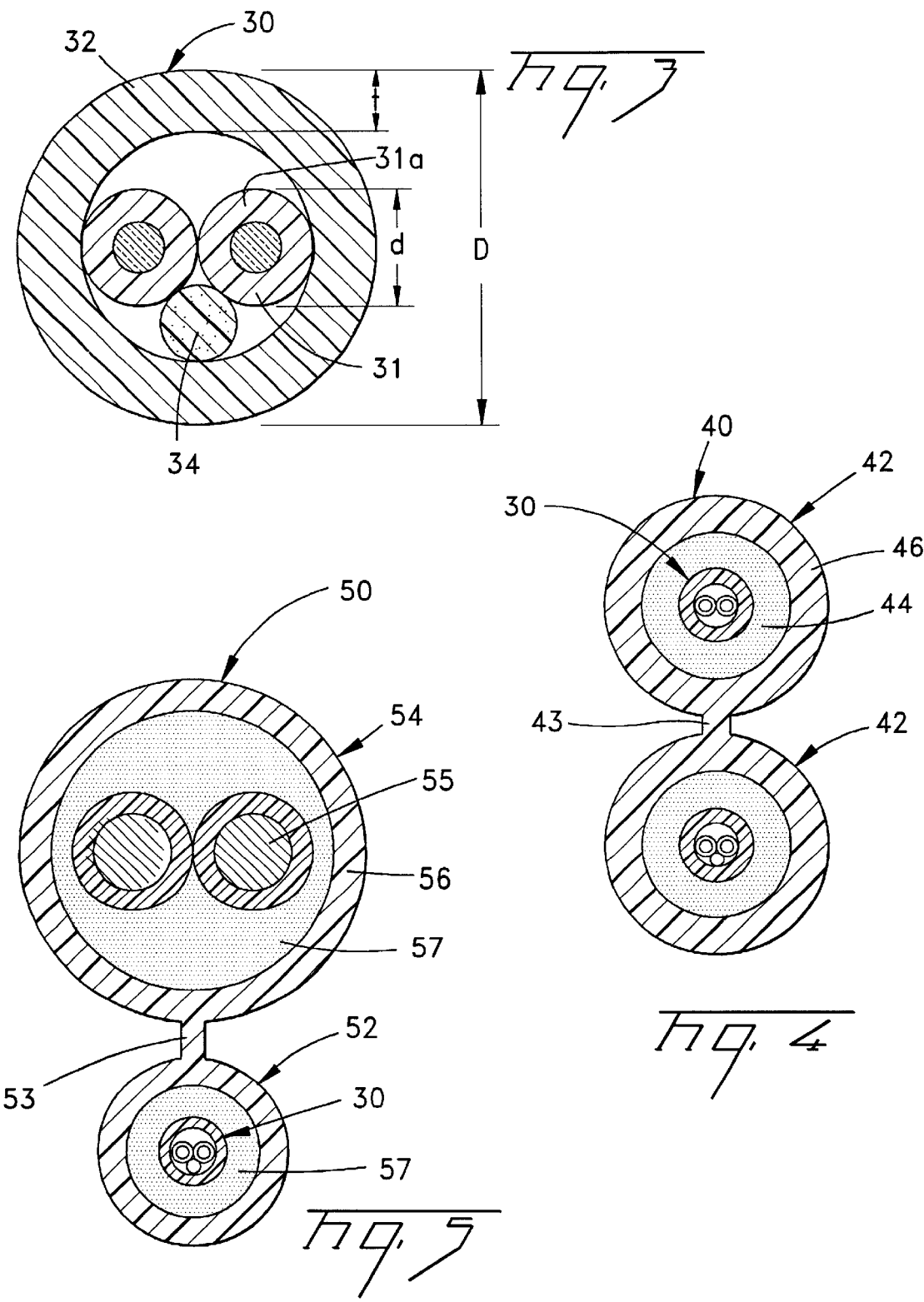

FIBER OPTIC CABLE UNITS

The present invention relates to cables having at least one optical fiber therein.

Conventional fiber optic cables include optical fibers that conduct light that is used to transmit voice, video, and/or data information. Conventional fiber optic zip cord cables comprise two sections that are joined by a frangible web, and are typically used in indoor environments and have the advantages of large bandwidth and low power loss. A composite cable includes an optical transmission component combined with at least one electronic/electrical transmission component. The advantages of electronic/electrical transmission components include low cost and straightforward termination procedures. Typical applications for fiber optic zip cord and composite cables include fiber-to-the-curb (FTTC), fiber-to-the-home (FTTH), fiber-to-the-desk (FTTD), plenum, riser, and local area networks (LANs). In a premises environment, zip cord and composite cables can be used to, for example, interconnect optical devices and/or hardware, computers, modems, and telephones.

Conventional composite cables can include a row of optical fibers and a separate row of electrical conductors. For example, U.S. Pat. No. 5,039,195 discloses a composite cable with two distinct cable units. A first cable unit includes optical fiber sub-units connected to strength members by a common jacket having interconnecting web sections. A second cable unit includes metal conductors connected by a common jacket having interconnecting web sections. Both cable units are surrounded by a cable jacket.

As disclosed in U.S. Pat. No. 5,602,953, a composite cable can include a combination of loose-buffered optical fibers and electrical conductors in a common jacket. The common jacket defines a flat structure including box-shaped sub-units, apparently formed by an injection molding process, with twisted electrical leads and optical fibers disposed in buffer tubes. The cable is designed to be separated into the box-shaped sub-units for connectorization/ termination.

Advances in fiber optic connector design have led to the development of multi-fiber connectors. During a typical connectorization process for conventional tight buffered fibers with a multi-fiber connector, the bulk of the buffer material at the fiber insertion side of the multi-fiber connector can result in connectorization difficulties. Additionally, handling and routing of optical fibers is difficult in fiber distribution centers and connector panels that can be overcrowded with a large number of buffered fibers, subunits, and cables.

OBJECTS OF THE INVENTION

It is an object of the present invention to provide a zip cord cable having at least two cords with respective jackets attached by a frangible web. At least one of the cords includes at least one buffer unit, the buffer unit comprises at least two optical fibers in a generally tight buffer layer, and a layer of filaments generally surrounds the buffer layer. The cords can each include optical transmission components. Alternatively, at least one of said cords can include an electrical transmission component, for example, a twisted pair of conductors. The filaments can be strength members that can include a water blocking substance.

BRIEF DESCRIPTION OF THE DRAWING FIGURES

FIG. 3 is a cross sectional view of a fiber optic buffer unit according to the present invention.

FIG. 4 is a cross sectional view of a fiber optic zip cord cable according to the present invention.

FIG. 5 is a cross sectional view of a composite zip cord cable according to the present invention.

DETAILED DESCRIPTION OF THE INVENTION

Figure 1:
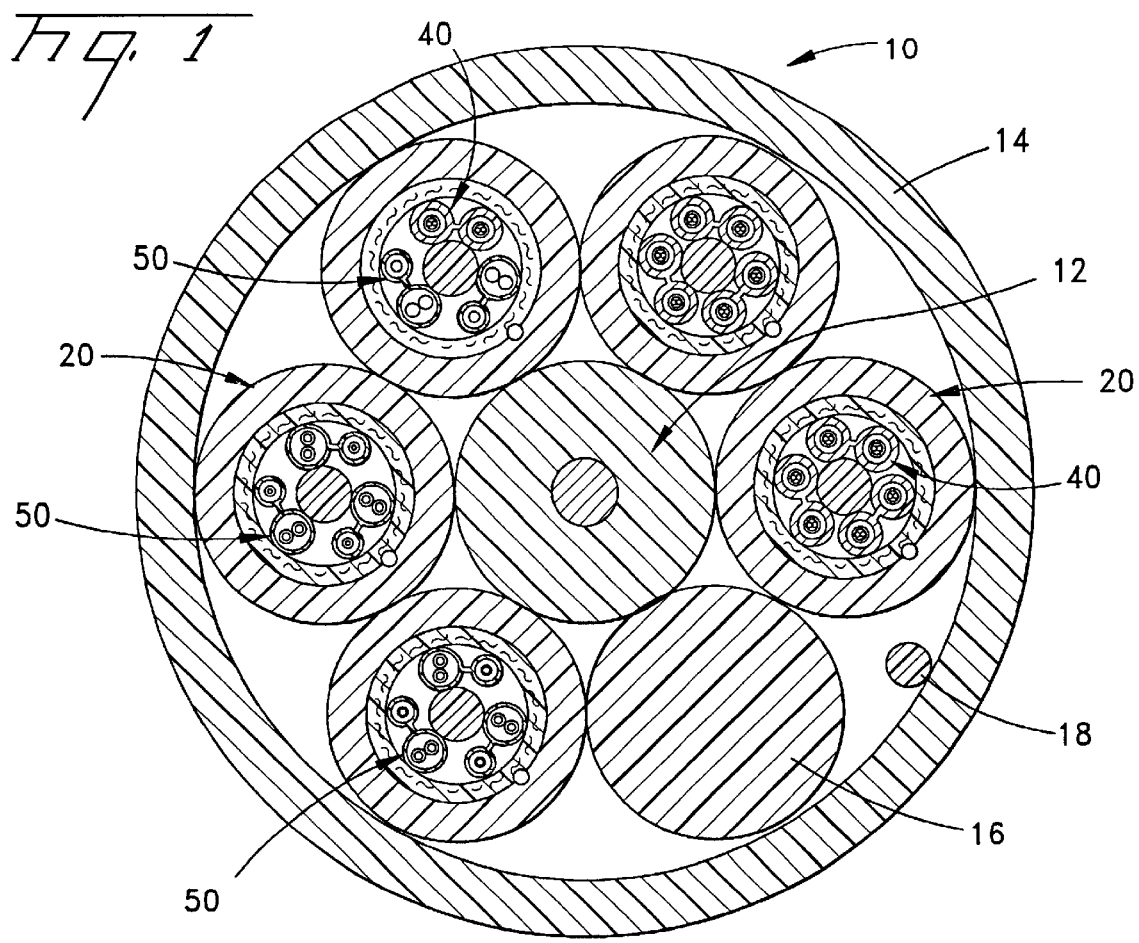
FIG. 1 is a cross sectional view of a unitized fiber optic cable according to the present invention.
Figure 2:
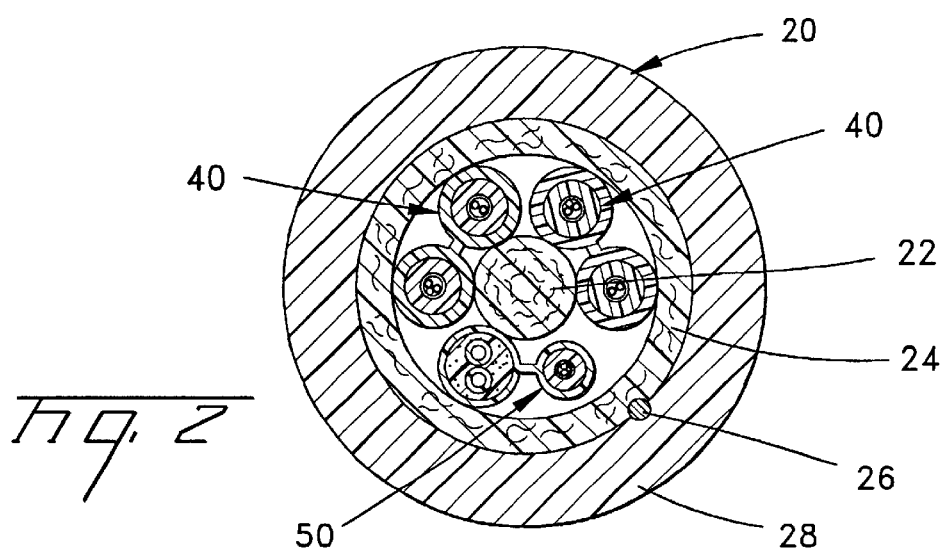
FIG. 2 is a cross sectional view of a fiber optic cable sub-unit as shown in FIG. 1.

Referring to FIGS. 1–5, a unitized fiber optic cable 10 according to the present invention will be described. Unitized fiber optic cable 10 includes subunit cables 20 that may be stranded about a central member 12 and surrounded by a jacket 14. Subunit cable 20 can include respective fiber optic and/or composite zip cord cables 40,50 (FIGS. 4–5). Zip cord cables 40,50 can include at least one buffer unit 30 (FIG. 3). Central member 12 can include a suitable thermoplastic layer over a steel wire, for example, a flame/smoke suppressant thermoplastic, or it may include a glass or a fiber reinforced member. Jacket 14 can be a flame/smoke retardant thermoplastic, for example, polyvinylchloride (PVC). Alternatively, jacket 14 may be formed of a plenum grade flame retarded PVC (FRPVC) having flame retardant and/or smoke suppressant type additives, as disclosed in U.S. Pat. No. 5,698,323 incorporated by reference herein. As an alternative to FRPVC, jacket 14 may include a fluoroplastic, e.g., polyvinylidene fluoride (PVDF), a fluorocompound as disclosed in U.S. Pat. No. 4,963,609 incorporated by reference herein, or blends of FRPVC/PVDF may be used. Additionally, for low smoke zero halogen (LSZH) applications jacket 21 can include a flame retardant polyethylene (FRPE), or other material as disclosed in U.S. Pat. No. 5,748,823 incorporated by reference herein. Unitized fiber optic cable 10 can include one or more filler rods 16 formed of, for example, a flame/smoke suppressant thermoplastic material or a glass or fiber reinforced rod. Typically, unitized fiber optic cable 10 will include a ripcord 18.

Subunit cable 20 (FIG. 2) can include a dielectric central member 22 about which at least one fiber optic zip cord 40 (FIG. 4) and/or composite zip cord cable (FIG. 5) is disposed. A layer of dielectric strength members 24 can surround cables 40,50, and a jacket 28 can surround strength members 24. In addition, cable 20 may include a ripcord 26 between strength members 24 and jacket 28. Central member 22 may be a relatively stiff fiber or glass reinforced plastic rod that may include a plastic overcoating. Alternatively, central member 22 may be a flexible bundle of strength members, e.g., aramid yarn or fiber glass that may include a thermoplastic overcoating. Strength members 24 are preferably longitudinally disposed or stranded about cables 20. Jacket 28 can be made of the same materials that jacket 14 is made of, or it can be made of any other suitable thermoplastic material.

Each zip cord cable 40,50 includes at least one buffer unit 30 (FIG. 3). Buffer unit 30 includes at least two optical fibers 31 that can be single mode, multi-mode, and/or multi-core optical fibers. Each optical fiber can have a glass core, and inner and outer primary thermoplastic coatings surrounded by a coloring layer 31a. Layer 31a can have a nominal outside diameter d, for example, of about 260 microns (±20 microns) (FIG. 3). A tight buffer jacket coating over the coloring layer is not altogether necessary, but in some applications it may be desired. Buffer unit 30 can include a buffer layer, for example, a generally round buffer tube 32 with a nominal wall thickness t of about 170 microns, and a maximum wall thickness of about 240 microns (FIG. 3). Buffer tube 32 can be dimensioned to include, for example, a nominal inside diameter roughly equal to an integer multiple of a nominal outside diameter of optical fiber 31. For example, the inside diameter of buffer tube 32 can be about twice nominal fiber diameter d. In addition, buffer tube 32 can include a nominal outside diameter D, for example, of about 900 microns (±100 microns). The dimensions of tube 32 can be such that portions of the outer surfaces of each optical fiber 31 will touch each other, and other portions will touch buffer tube 32, in a manner that permits sliding contact therebetween. On the other hand, tube 32 is dimensioned so that fibers 31 are held tight enough to inhibit twisting and/or cross-overs of the optical fibers. For example, with reference to buffer unit 30, a sum of the discrete clearances between the optical fibers themselves, and between the fibers and buffer tube 32, can be less than the outside diameter of one optical fiber 31. Buffer unit 30 may comprise other configurations as well, for example, as disclosed in U.S. Ser. No. 09/282,343 incorporated by reference herein.

Buffer tubes 32 can be formed of a non-halogenated thermoplastic with low smoke evolution characteristics having, for example, a suitable limiting oxygen index. For example, the buffer tube material can be a flame retarded, non-halogenated polyolefin (FRPO), e.g., a flame retarded polyethylene (FRPE) or a flame retarded polypropylene (FRPP). FRPE is typically not a plenum grade material as it has little or no resistance to flame spread above certain temperatures, but it has low smoke evolution characteristics. Other suitable materials include flame retarded EVA, Nylon, and polyesters, e.g., co-polyesters as disclosed in U.S. Pat. No. 4,708,975, U.S. Pat. No. 4,994,549, or U.S. Pat. No. 4,826,899 which are respectively incorporated by reference herein. Buffer unit 30 can include a waterblocking substance, e.g., a superabsorbent powder, a filling compound such as a gel or grease, and/or a waterblocking yarn 34.

Buffer unit 30 according to the present invention offers the advantages of ease of handling and connectorization, for example, connectorization to multi-fiber connectors. More specifically, a buffer unit 30 can be provided for each fiber insertion aperture of the multi-fiber connector. Multiple fibers 31 in a nominal 900 micron OD buffer tube 31 reduces the bulk of material at the back of the multi-fiber connector thereby rendering the connectorization, and handling and routing of optical fibers less difficult. In addition, fiber optic cables according to the present invention have a high packing density, especially where second and third layers of cables 20 are added.

At least one buffer unit 30 can be included as a component in zip cord cables 40,50 (FIGS. 4–5). More particularly, zip cord cable 40 can include two optical cords 42 connected by a frangible web 43. Each cord 42 can include a jacket 46 and a layer of filaments, for example, strength members 44 that generally surround a respective buffer unit 30. The OD of cord 42 can be, for example, about 3.0 mm or less. Composite zip cord cable 50 can include a fiber optic cord 52 connected to an electronic/electrical cord 54 by a frangible web 53. Each cord 52,54 can include a jacket 56 and a layer of filaments, for example, strength members 57. Electrical cord 54 includes at least one electrically conductive member 55, for example, a twisted pair of electrical conductors. Strength members 44,57 can comprise, for example, aramid strength members with or without a coating of water blocking grease, or a superabsorbent powder or matrix coating. Jackets 46,56 can be formed of, for example, PVC, FRPE, PE, or a UV curable resin, e.g., acrylate. Webs 43,53 are sized to be ripped manually or with tools as the cords are separated.

Manufacture of cables 40,50 of the present invention can be accomplished by passing the optical and electrical components through an extruder and extruding jackets 46,56 therearound. Prior to extrusion, filaments 44,57 can be coated with a talc powder to prevent the sticking of jackets 46,56 to the filaments. The die profile can be shaped so that cords 42,52,54 have a generally round cross section, or the die can be configured to define other cross sectional shapes as well. The die profile forms webs 43,53 with thicknesses that are generally less than the outside diameter (OD) of at least one of the cords. Webs 43,53 can space cords 42,52,54 apart a suitable distance for easy separability thereof. The respective outside diameters of cords 42,52,54 need not be equal.

In the finished product, a craftsman can easily separate the cords as desired, remove a section of jackets 46,56, and connectorize/terminate the fibers and/or electrical conductors. Fiber optic cables made according to the present invention can be suitable for use in plenum, riser, LSZH, and indoor/outdoor applications. In addition, fiber optic cables made according to the present invention can advantageously meet ICEA-596 requirements with respect to mechanical tests, for example, tensile, compression, cycle flex, and impact tests.

The present invention has thus been described with reference to the foregoing embodiments, which embodiments are intended to be illustrative of the inventive concepts rather than limiting. Persons of skill in the art will appreciate that variations and modifications of the foregoing embodiments may be made without departing from the scope of the appended claims. For example, the wall thicknesses of jackets 46,56 may be increased to produce heavy-duty, crush resistant cables. Cords 42,52 can include more than one buffer unit 30, and cord 54 can include at least one buffer unit 30. The quality and number of filaments 44,57 may be varied to produce high strength cables. Indoor/outdoor cables made in accordance with the present invention could include UV radiation resistant as well as flame retardant materials. To qualify as an indoor/outdoor cable, one or more means to prevent water intrusion would be incorporated into the cable, for example: a water blocking grease or gel; water swellable threads, tape, or powder; and/or water swellable coatings applied between the jacket and buffer unit. Additional water blocking capabilities can be included between the buffer and the optical fibers, for example, greases, gels, or water swellable powders, threads, or coatings. Moreover, the present invention includes zip cord cables 40,50 defining the core of a fiber optic cable, e.g., for single tube or interconnect/jumper cables. In addition, buffer units 30 may include more than two optical fibers, and one or more strength filaments, e.g., aramid fibers, inside the buffer layer. Moreover, tubes 32 can comprise multiple layers of thermoplastics, for example, as disclosed in U.S. Pat. No. 4,664,472 incorporated by reference herein. Optical fibers 31 and/or the inner surface of tubes 32 can include a friction-reducing interfacial layer, for example, TEFLON and/or a gel or grease composition, for enhancing sliding contact between optical fibers 31 and buffer tube 32.

Further, electrical conductor 55 can be any suitable electrical transmission component or a combination of electrical components, e.g., a co-axial cable or a non-twisted conductor. Where wavelength selection features are desired in the optical fibers of the zip cords, one or more periodic refractive indices can be written into the fiber before buffering, for example, as disclosed in U.S. Pat. No. 4,725,110, U.S. Pat. No. 5,620,495, U.S. Pat. No. 5,718,738, and/or U.S. Pat. No. 5,818,630, all of which are respectively incorporated by reference herein. For identification purposes, a craftsman may be able to distinguish between the cords by way of an identification means provided on either or both of the cords. The identification means can include different colors for the cords, one or more extruded or inked-on stripes, or any other suitable identification means.

Accordingly, what is claimed is:

1. A zip cord cable, comprising:
   at least two cords having respective jackets attached by a frangible web;
   at least one of said cords includes at least one buffer unit, the OD of at least one of said cords being about 3.0 mm or less, said buffer unit comprising at least two optical fibers generally in contact with a buffer layer, and a layer of filaments generally surrounding said buffer layer.

2. The zip cord cable of claim 1, at least one of said cords includes an electrical/electronic transmission component.

3. The zip cord cable of claim 1, said electronic/electrical transmission component comprising a twisted pair of conductors.

4. The zip cord cable of claim 1, said filaments comprising strength members.

5. The zip cord cable of claim 1, said filaments comprising a water blocking substance at least partially dispersed therein.

6. The zip cord cable of claim 1, said buffer layer having a nominal OD of about 900 microns (±100 microns).

7. The zip cord cable of claim 1, said at least two optical fibers each having respective outermost surfaces at least partially in contact with each other.

8. The zip cord cable of claim 1, said at least two optical fibers being generally tightly received by said buffer layer permitting sliding contact therebetween.

9. The zip cord cable of claim 1, said buffer layer comprising a tube.

10. The zip cord cable of claim 1, said buffer layer comprising a tight buffer.

11. The zip cord cable of claim 1, at least one of said optical fibers having a nominal outside diameter of about 260 microns.

12. The zip cord cable of claim 1, said buffer layer having a nominal thickness of about 170 microns.

13. The zip cord cable of claim 1, said buffer unit comprising at least three optical fibers.

14. The zip cord cable of claim 1, said buffer unit comprising a waterblocking substance therein.

15. The zip cord cable of claim 1, said buffer unit comprising an interfacial layer between said buffer layer and at least one of said optical fibers.

16. The zip cord cable of claim 1, said cable including a compound selected from the group consisting of FRPO, FRPE, PVC, FRPVC, PE, FRPE, PVDF, EVA, NYLON, Polyester, UV curable resin, and blends thereof.

17. A zip cord cable, comprising:
   at least two cords having respective jackets attached by a frangible web;
   at least one of said cords includes at least one buffer unit, said buffer unit comprising at least two optical fibers generally in contact with a buffer layer, and a layer of filaments generally surrounding said buffer layer, said buffer layer having a nominal OD of about 900 microns ±100 microns.

18. A zip cord cable, comprising:
   at least two cords having respective jackets attached by a frangible web;
   at least one of said cords includes at least one buffer unit, said buffer unit comprising at least two optical fibers generally in contact with a buffer layer, and a layer of filaments generally surrounding said buffer layer, at least one of said optical fibers having a nominal outside diameter of about 260 microns.

19. A zip cord cable, comprising:
   at least two cords having respective jackets attached by a frangible web;
   at least one of said cords includes at least one buffer unit, said buffer unit comprising at least two optical fibers generally in contact with a buffer layer, and a layer of filaments generally surrounding said buffer layer, said buffer layer having a nominal thickness of about 170 microns.

20. A zip cord cable, comprising:
   at least two cords having respective jackets attached by a frangible web;
   at least one of said cords includes at least one buffer unit and at least one of said cords includes an electrical/electronic transmission component, said buffer unit comprising at least two optical fibers generally in contact with a buffer layer, said buffer layer comprising a tube having a nominal thickness of about 170 microns, and a layer of filaments generally surrounding said buffer layer.

* * * * *